Patented Oct. 17, 1933

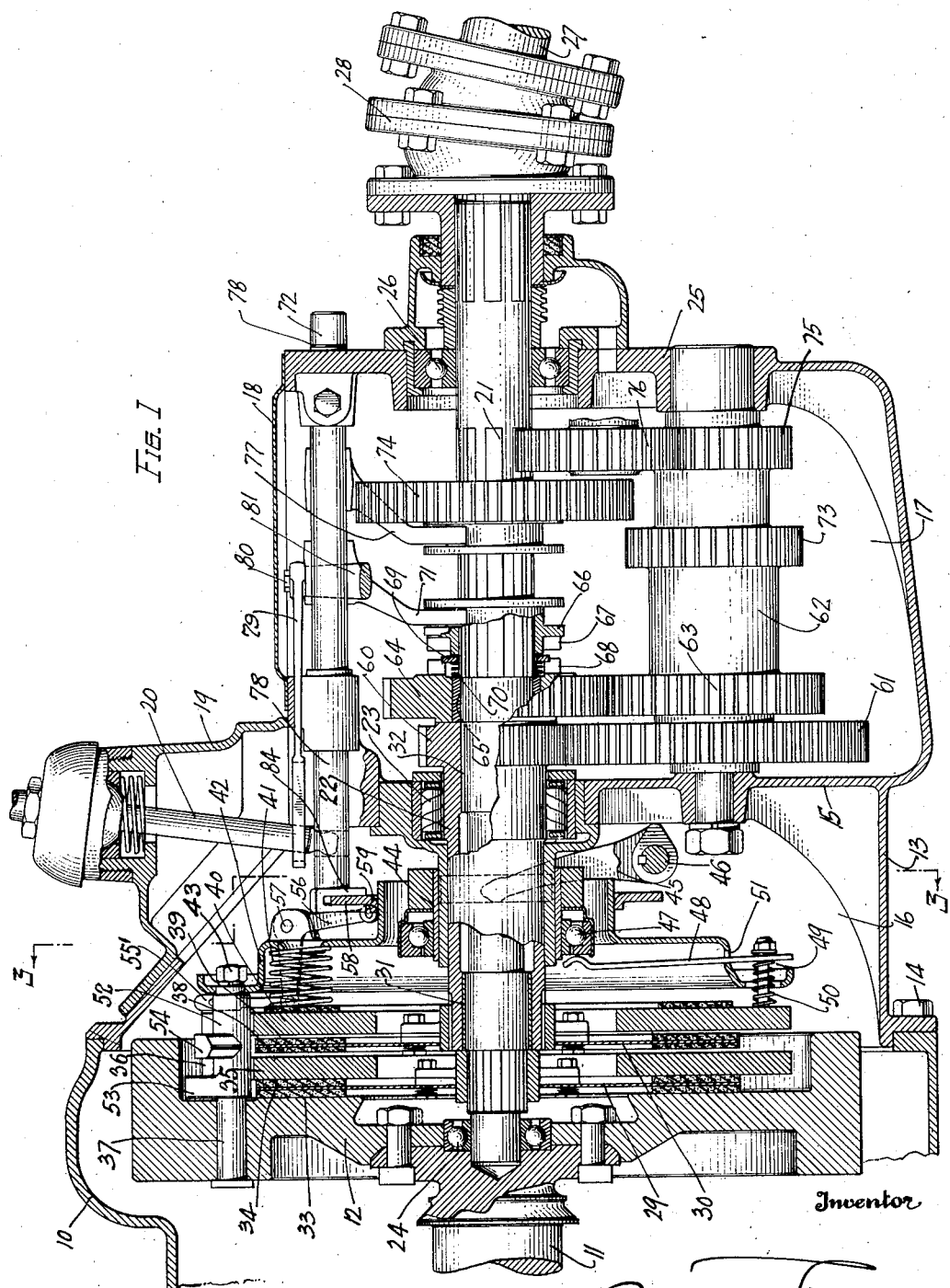

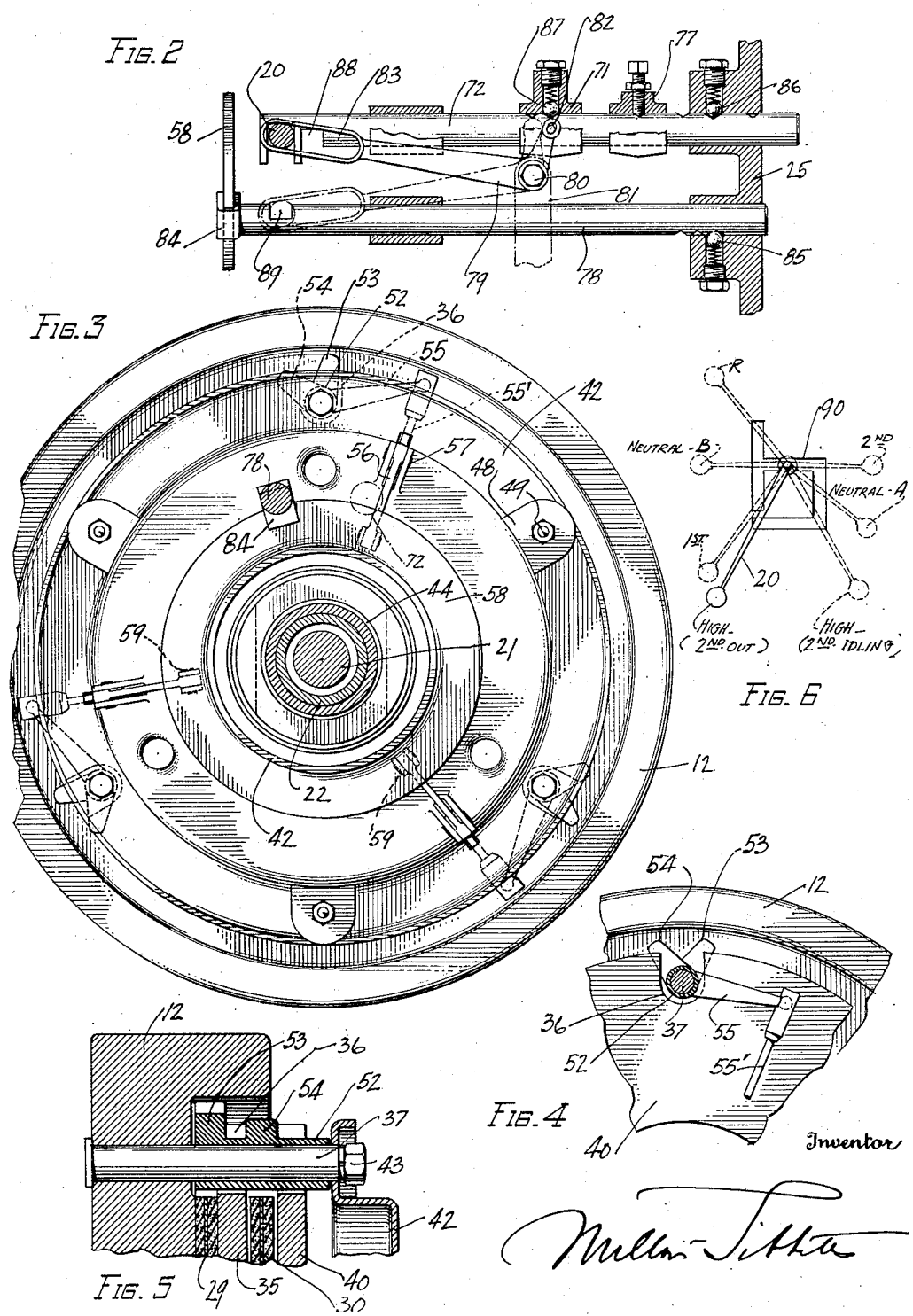

1,931,241

UNITED STATES PATENT OFFICE 1,931,241

TRANSMISSION MECHANISM

Milton Tibbetts, Detroit, Mich., assignor to Packard Motor Car Company, Detroit, Mich., a corporation of Michigan Application June 17, 1929. Serial No. 371,547

11 Claims. (Cl. 74—59)

This invention relates to motor vehicles, and more particularly to the transmission mechanism thereof.

In the conventional form of clutch and gearing in motor vehicles, there is a plate clutch between the engine and clutch shaft, and a three-speed and reverse gearing between the clutch shaft and the propeller shaft. This gearing is usually of the sliding gear type, and difficulty is sometimes experienced in shifting from second speed to high speed, or vice versa. The first speed and reverse are used so infrequently that shifting into them is of little consequence, but the likelihood of clashing the second and high gears is more pronounced.

It is one of the objects of the present invention to eliminate all clashing of gears in changing from second to third speed, or from third (high) speed to second speed.

Another object of the invention is to provide constant mesh gearing between the shafts for second gear together with independently operating clutches for connecting one or another of said gears with the engine shaft.

Another object of the invention is to provide independently operated clutches for two driven shafts together with means for determining the operation of these clutches in accordance with the position of the intermeshed gears.

Other objects of the invention will appear from the following description taken in connection with the drawings, in which:

Figure 1 is a longitudinal sectional view through a transmission mechanism embodying the invention, Figure 2 is a plan view of some of the shifter mechanism shown in Figure 1, Figure 3 is a transverse section substantially on the line 3—3 of Figure 1, Figure 4 is a fragmentary view similar to Figure 3 showing some of the clutch parts in another position, Figure 5 is a fragmentary view of some of the clutch parts, and Figure 6 is a plan view of the shifter lever in its various positions.

Referring to the drawings, 10 represents the rear end of an engine or prime mover, and 11 is the crankshaft of the engine upon which is mounted a fly-wheel 12, of conventional form. A casing 13 is secured to the rear end of the engine 10 as by bolts 14, and this casing is divided into two compartments by a partition 15, the forward compartment 16 constituting a clutch casing, and the rear compartment 17 constituting a gear casing.

A cover 18 gives access to the gearing, and a cover 19 gives access to the clutch. In the cover 19 is suitably mounted a shifter lever 20, the operation of which will be hereinafter described. Mounted so-axially with the crank shaft 11 are two driven shafts, one of which, indicated at 21, may be termed the final driven shaft, and the other, indicated at 22, may be termed the intermediate driven shaft. The shaft 22 is telescoped over the forward end of the shaft 21, and it is supported in the partition 15 in a bearing 23, while the shaft 21 is supported at its front end in the shaft 11, through a bearing 24, and at its rear end in the rear wall 25 of the casing 17, through a bearing 26. Bearings 31 and 32 are provided between the shafts 21 and 22. The final driven shaft 21 is shown as connected to a motor vehicle propeller shaft 27 through a suitable universal joint 28, in the usual way.

Upon the forward end of the driven shaft is splined the hub of a clutch plate 29, and upon the forward end of the driven shaft 22 is splined the hub of a clutch plate 30. These are the driven plates of a clutch means between the driving shaft 11 and the two driven shafts, and the forward plate 29, the one attached to the shaft 21 has a friction surface 33 secured to one side thereof adapted to be engaged by the fly side thereof adapted to be engaged by the fly wheel 12 and a friction surface on the opposite side adapted to be engaged by a plate 35 which is arranged to turn with the fly-wheel by reason of the notches 36 in the plate and the pins 37 extending from the fly-wheel into said notches. The driven plate 30, the one on the shaft 22, also has a friction surface 38 secured to one side thereof and a friction surface 39 on the opposite side, the former being adapted to be engaged by the opposite side of the plate 35 and the latter being adapted to be engaged by a plate 40 which is similar to the plate 35 and similarly keyed to move with the fly wheel.

Several springs 41, one only of which is shown in Figure 1, are provided for yieldingly pressing the clutch plates and surfaces toward contact or engaging position, and these springs abut against a cover 42 mounted upon and secured to the ends of the pins 37 as by nuts 43. Thus, the cover 42 turns with the driving shaft and the fly-wheel 12.

Manually operated releasing means for the clutch is provided in the form of a shifter sleeve 44 operated by an arm 45 on a rock-shaft 46 which latter may be connected to a suitable pedal, and from the sleeve 44 through a bearing 47 extends a lever 48 to a pin 49 on the plate 40. There are several of these levers and pins, and only one is shown in Figure 1. A spring 50 is provided to prevent rattle when the clutch is engaged. The lever 48 extends through an opening 51 in the cover 42, whereby a fulcrum is obtained for pulling the plate 40 towards the right as the sleeve 44 is moved towards the left by operation of the rock-shaft 46. This action compresses the springs 41 and holds all of the clutch plates out of engagement. Because of the gearing connections that will be hereinafter described, it is desirable that one only of these clutch means shall be engaged at a time. That is, only one driven plate 29—30 must be driven by the driving shaft 11. Means are provided, therefore, for retaining one of these clutch plates in released position when the other is engaged, and vice versa. This is done by holding the pairs of friction surfaces in separated position, and in one position of the separating means both pairs of friction surfaces are separated so that there can be no engagement of either clutch means.

This separating mechanism comprises a sleeve 52, one of which is mounted on each of the pins 37, thus preferably making three of these sleeves arranged equidistant around the clutch. Each sleeve has two separating lugs 53 and 54, and the face of the lugs 53 is beveled on one side, and that of the lug 54 is beveled on the other side, as shown particularly in Figure 1. Each of these lugs is slightly wider or thicker than the over-all thickness of the corresponding clutch plate 29—30 so that when a lug is moved to position between opposing clutch surfaces, these surfaces are maintained out of contact with the particular driven plate which they oppose. The sleeve 52 is arranged for a small amount of end-wise movement on its pin 37, so that it may float with the plates 35 and 40 as the clutch plate 29 is engaged.

Each of the sleeves 52 is adapted to be rocked from one extreme position to another by means comprising an arm 55 which may be keyed to or formed as an integral part of the sleeve, a bell-crank lever 56 which is pivoted on the cover 42 as at 57, and a shifter ring 58, the bell-crank having one arm connected by a link 55' to the arm 55, and the other arm pivoted to the ring 58, as at 59.

In Figure 3, the sleeve is shown with its lug 54 engaged between the plates 35 and 40, so that the clutch disc 30 cannot be engaged. It will be seen that the lug 53 is in the notch 36 of clutch plate 35 so that there is no separation of friction surfaces 33—34. In this position of the sleeve 52, the clutch spring 41 will cause engagement of the fly wheel 12 and the plate 35 with the clutch surfaces 33 and 34 on the disc 29, which is on the final driven shaft 21. Thus is caused a direct drive from the driving shaft 11 to the propeller shaft 27. By shifting the sleeve 52 to its other extreme position, when the driving clutch is disengaged, the lug 53 will permit plates 35 and 40 to be pressed together so that the driven disc or plate 30 will be driven and the plate 29 will run idle between its friction surfaces. This will cause a drive from driving shaft 11 directly to intermediate driven shaft 22, with results that will be described in connection with the gearing.

Intermediate position of the sleeve 52 is shown in Figure 4, and here both lugs 53 and 54 are operating to separate the clutch surfaces, so that there would be no drive from the driving shaft as the clutch pedal was released. This constitutes a neutral position for the two clutches.

Both of the driven shafts 21 and 22 extend into the gear compartment 17, and the shaft 21 extends entirely through it. On the end of the shaft 22 just inside of the gear compartment is a gear or pinion 60, and this gear meshes with a larger gear 61 on a countershaft 62 which is also mounted in the gear casing. There is also a gear 63 on the countershaft 62 and this meshes with a gear 64, which turns freely on a bearing 65 on the shaft 21. The gears 60—61 and the gears 63—64 are constant mesh gears.

A positive clutch is provided for clutching the gear 64 to the driven shaft 21. This is in the form of a clutch sleeve 66 splined on the shaft 21, and provided with teeth 67 which are adapted to engage with teeth 68 on the gear 64. A synchronizing device is provided in the form of a sliding plate 69, and a spring 70 for bringing the gear 64 up to the speed of the shaft 21 before the teeth 67—68 are engaged. This synchronizing device need not be as quick acting as is required in some instances because this positive clutch is engaged when either the second or third gear is used and is not, therefore, shifted as often as in other cases.

The clutch sleeve 66 is shifted by an arm 71 adapted to slide on a rod 72 mounted in the upper part of the gear casing 17. The means for shifting the arm will be later described.

A gear 73 is mounted on the countershaft 62 and is adapted to engage a larger sliding gear 74 splined on the shaft 21, and when so engaged, a low speed will be transmitted through the gearing. There is also a gear 75 on the countershaft 62 and this is in constant mesh with an idling reverse gear 76 suitably mounted in the gear casing. The gear 74 may also be moved into sliding engagement with the reverse gear 76 so that reverse drive may be transmitted through the gearing. The gear 74 is moved from one position to another by an arm 77 which is fixedly secured on the shifter rod 72, and is adapted to be moved by that rod.

It will be understood that the gear 64 may be clutched to the driven shaft 21, or not, when the high speed clutch means, that is the clutch disc 29, is to be engaged; it must be in clutched relation when the second speed clutch means, that is the clutch disc 30 is to be engaged, but it must be unclutched from the shaft 21 when either the first or reverse gears are to be used.

The means for shifting the clutch control sleeve 52 and the clutch 66 and gear 74 comprise the arm 71 and shifter rod 72 above described together with another shifter rod 78, mounted parallel to the rod 72. Also, there is a bell-crank lever 79, pivotally mounted at 80, on a bracket 81, in the gear casing. One arm of the lever 79, by a pin and slot connection 82 to the arm 71, moves the arm 71 on the rod 72 as the bell-crank is rocked. The other arm of the bell-crank 79 has a long slot 83 to receive the shifter lever 20, so that as the shifter lever is moved cross-wise of the vehicle the bell-crank will be rocked on its pivot, but the longitudinal movements of the lever 20 will have practically no effect on the bell-crank.

The shifter rod 78 extends to a point adjacent the ring 58 and is provided with a yoke 84 which extends over the ring 58, and as the rod 78 is moved lengthwise the ring 58 is shifted to rock the bell-cranks 56 and thereby shift the sleeve 52. Suitable notches are provided in the shift levers and yielding stops 85, 86, and 87 are employed to hold the shift rods in their various positions.

The shifter rod 72 is provided with a notch 88 into which the end of the shifter lever 20 may extend when the latter is in neutral position. The rod 78 has a similar notch 89, and by moving the shifter lever 20 into one or the other of these notches, the rod 72 or the rod 78 may be shifted from one position to another to effect the various changes of gear and clutch arrangements.

In Figure 6, somewhat diagrammatically, is shown the various positions of the gear shift lever 20. The quadrant 90 may be an actual quadrant or it may be an imaginary one, but the lever at a point above its fulcrum will move through the slots in this quadrant to effect the various gear and clutch changes.

In full lines, the shifter lever 20 is shown in the high speed position wherein the high speed clutch 29 is engageable and the clutch 66 is disengaged. In this position there is a direct drive from the shaft 11 through the shaft 21 to the propeller shaft 27, and, with the exception of gear 74, none of the gears rotate except as friction in the bearings may carry them around. This position of the lever is indicated as "High—2nd out."

By moving the lever 20 from full line position in Figure 6 to the position indicated as "High—2nd idling" the bell-crank 79 will have been shifted to its dotted line position shown in Figure 2, and the clutch 66 will have become engaged with gear 64, so that this gear is now carried around with the shaft 21, and it will rotate countershaft 62 and driven shaft 22, the latter shaft being driven somewhat faster than the shaft 21 by reason of the gearing connecting them. This will mean that the clutch plate 30 will run somewhat faster than the other clutch plates, but it will be out of contact so that it will make no difference.

Now, by shifting lever 20 forwardly to the position marked "Neutral—A" no change will be made in the gearing positions or in the clutch 66, but the shifter rod 78 will shift the ring 58 and this will rock the control sleeve 52 (assuming that the clutch has been thrown out) and the lugs 53 and 54 will take the neutral position in which they are shown in Figure 4. In this position the clutch pedal may be released, but neither clutch will engage.

By shifting the lever 20 farther forward to position marked "2nd" the shifter rod 78 will have been moved farther to the rear and control sleeve 52 will be moved to its other extreme position so that clutch 29 is held out of engagement and clutch 30 is allowed to engage. This will effect a second speed drive through shaft 22, gears 60—61, gears 63—64, clutch 66, and shaft 21.

Now by shifting the lever 20 to the left, the bell-crank 79 will again be rocked, thus shifting the clutch 66 out of engagement and leaving clutch 29 so that it cannot be engaged, and clutch 30 only engageable. This is also a neutral position and is marked "Neutral—B".

Shifting the lever 20 to the rear to position marked "1st", only the shifter rod 72 will be moved and this will slide gear 74 into engagement with 73, and then by engaging clutch 30, a low speed drive will be effected. By moving lever 20 forward to position marked "R", only the gear 74 is moved and this is shifted from engagement with gear 73 to engagement with reverse gear 76, thus effecting a reverse gear drive from driving shaft 11 to driven shaft 21.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described the various features of my invention, what I claim and desire to secure by Letters Patent is:

1. In a transmission mechanism, the combination of a driving shaft, an intermediate driven shaft, a final driven shaft independently operating clutch means between the driving shaft and each of said driven shafts, a master control means to render both of said clutch means inoperative, shiftable means independent of said master control means for selecting the clutch to be engaged, gearing between said driven shafts, shiftable means for said gearing, and a single lever independent of said control means for operating the clutch selecting means and the gear shifter means.

2. In a transmission mechanism, the combination of a driving shaft, an intermediate driven shaft, a final driven shaft, clutch means on the drive shaft engageable with either, but not both, of said driven shafts, a master control means to render said clutch means inoperative, gearing between the said driven shafts, means for shifting said gearing, and means dependent upon the gear shifter means and independent of said control means for determining which of said driven shafts shall be placed in driving relationship with the driving shaft.

3. In a transmission mechanism, the combination of a driving shaft, an intermediate driven shaft, a final driven shaft, friction clutch means for connecting said driving shaft to either of said driven shafts, a master control means to render said clutch means inoperative, a positive clutch for inter-connecting the said driven shafts, a lever for shifting said positive clutch, and means connecting to said lever and independent of said control means for selecting the action of said friction clutch means.

4. In a transmission mechanism, a driving shaft, two telescoping driven shafts, means connecting the driving shaft with either of the driven shafts, a gear fixed to the countershaft, a gear fixed to the outer driven shaft, said gears being in constant mesh, other gears driven from the countershaft, a slidable gear splined to the inner driven shaft and adapted to be moved into and out of mesh with some of the gears driven from the countershaft, a gear freely mounted on the inner driven shaft, and in mesh with one of the gears driven by the countershaft, a clutch for clutching the free gear to its shaft, and interconnecting cooperating means for moving the slidable gear and for actuating the clutch so that when said slidable gear is in mesh with either of its cooperating gears the free gear will be disengaged from the inner shaft.

5. In a transmission mechanism having a gear housing, a driving shaft, two telescoping driven shafts, means connecting the driving shaft with either of the driven shafts, a countershaft, a gear fixed to the countershaft, a gear fixed to the outer driven shaft, said gears being in constant mesh, other gears fixed to the countershaft, a gear freely mounted on the inner driven shaft and in constant mesh with one of the gears on the countershaft, a clutch on the inner driven shaft movable to clutch the free gear to the shaft, an idler gear journaled in the gear housing and in constant mesh with one of the gears on the countershaft, a slidable gear splined to the inner driven shaft adapted to be moved into or out of mesh with either said idler gear or said fixed gear on the countershaft, and interconnecting cooperating means for moving the slidable gear and for actuating said clutch so that when said slidable gear is in mesh with either of its cooperating gears the free gear will be disengaged from the inner shaft.

6. In a transmission mechanism, a driving shaft, a final driven shaft arranged coaxially with the driving shaft, an intermediate driven shaft for transmitting power from the driving shaft to the final driven shaft under certain conditions, gears on said shafts, independent clutch means for connecting either the final driven or the intermediate driven shaft to the driving shaft, master control means to render said independent clutch means inoperative, gears on the intermediate shaft and on the final driven shaft, a countershaft gearing between the intermediate shaft and the final driven shaft having gears connected thereto which mesh with the gears on both of said driven shafts for driving the final driven shaft at low, intermediate or high speed or in reverse, said gears which effect the intermediate speed being in constant mesh, means for shifting the gears to effect the various driving speed changes, and means depending upon the gear shifting means and independent of said control means for selecting which of said clutch means shall be connected by said control means to the driving shaft.

7. In a transmission mechanism, a driving shaft, two telescoping driven shafts, means for connecting the driving shaft with either of the driven shafts, a countershaft, constant mesh gearing between the outer driven shaft and the countershaft, other gears on the countershaft, a freely running gear on the inner driven shaft in constant mesh with one of the gears on the countershaft, a slidable clutch on the inner shaft adapted to clutch the free gear to the shaft, a slidable gear splined on the inner shaft adapted to be moved into or out of mesh with some of the gears on the countershaft, and interdependently cooperating means for moving the slidable gear into or out of mesh with the countershaft gears and for moving the clutch to engage or disengage the free gear.

8. In a transmission mechanism, a driving shaft, two aligned driven shafts, independently operating friction clutch means between the driving shaft and each of the driven shafts, a countershaft, constant mesh gearing between one of the driven shafts and the countershaft, a second gear fixed to the countershaft, a freely running gear on the other driven shaft in constant mesh with said second gear, positive clutch means adapted to clutch the free gear to its shaft, interdependently cooperating mechanism for selecting the friction clutch to be engaged and for engaging the positive clutch so that when one of said friction clutches is engaged, the positive clutch will be disengaged from the free gear and when the other of said friction clutches is engaged, the positive clutch may either be engaged with the free gear or disengaged therefrom.

9. In a transmission mechanism, a driving shaft, two telescoping driven shafts, independently operating friction clutch means between the driving shaft and each of the driven shafts, a countershaft, constant mesh gearing between the outer driven shaft and the countershaft, other gears on the countershaft, a freely running gear on the inner driven shaft in constant mesh with one of the gears on the countershaft, a positive clutch on the inner shaft adapted to clutch the free gear to the shaft, a slidable gear splined to the inner shaft adapted to be moved into or out of mesh with some of the gears on the countershaft, interdependently cooperating means for moving the slidable gear into or out of mesh with the gears on the countershaft and for moving the positive clutch to engage or disengage the free gear and for selecting the friction clutch to be engaged, said mechanism being arranged so that the slidable gear is out of mesh with its cooperating gears when the positive clutch engages the free gear, and when the positive clutch is disengaged from the free gear the slidable gear may or may not be moved into mesh with its cooperating gears.

10. In a transmission mechanism, the combination of a driving shaft, two driven shafts, clutch means for driving either of the driven shafts from the driving shaft, means for releasing said clutch means, gearing between the driven shafts, means for shifting the gearing to several geared positions and to neutral, and means for retaining said clutch means in released position independently of the releasing means, thereby constituting a neutral position for said clutch means whereby said mechanism is provided with two separate and independent neutral positions.

11. In a transmission mechanism, the combination of a driving shaft, an intermediate driven shaft, a final driven shaft, friction clutch means for connecting said driving shaft to either of said driven shafts, a positive clutch for interconnecting the said driven shafts, a lever for shifting said positive clutch, and control mechanism connecting to said lever and including lug means carried by said driving shaft for selecting the action of said friction clutch means.

MILTON TIBBETTS.